Patented Apr. 28, 1936

2,038,788

UNITED STATES PATENT OFFICE 2,038,788

PROCESS FOR THE PRODUCTION OF FERTILIZER MATERIAL

Edward W. Harvey, Highland Park, N. J., and Herman Albert Beekhuis, Jr., Syracuse, N. Y., assignors to The Barrett Company, New York, N. Y., a corporation of New Jersey No Drawing. Application June 27, 1930, Serial No. 464,329

3 Claims. (Cl. 71—7)

This invention relates to a process for the production of nitrogen-phosphorus fertilizer material, and more particularly to the production of a superphosphate fertilizer containing ammonium sulfate.

A fertilizer material has heretofore been prepared by treating a phosphate rock with sulfuric acid to convert tricalcium phosphate contained therein which is insoluble and unavailable as plant food into monocalcium phosphate which is soluble and available. The product obtained is that usually referred to as superphosphate and in manufacturing superphosphate the phosphate rock is treated with a sulfuric acid, for example about a 50° Bé. to 52° Bé. sulfuric acid prepared by diluting a 60° Bé. sulfuric acid with water, and the mixed materials allowed to stand in a den for a sufficient period of time so that the acid is largely absorbed and a porous mass obtained. This mass is broken up and stored for relatively long periods of time in order that the chemical reactions may go to completion as fully as practicable and a product be obtained which, upon grinding, is satisfactory for use as a fertilizer and contains substantially all of its phosphate content in an available form. It has also heretofore been a practice to mix superphosphate prepared as described with ammonium sulfate in order to produce a fertilizer containing both of the elements phosphorus and nitrogen which are necessary for plant growth.

The manufacture of mixed superphosphate-ammonium sulfate fertilizers by the process above referred to entails numerous difficulties. It necessitates, as noted, long storing of the phosphate material after treatment with sulfuric acid in order that the chemical reactions may go to completion, after which the mass which has caked together must be broken up and ground. Further, after mixing the thus ground superphosphate with ammonium sulfate, the mixed material will cake upon standing, and, accordingly, before the fertilizer is marketed the mixture must be cured by allowing it to stand for a considerable period of time and then ground to put it in condition for distribution in the field.

It is an object of the invention to provide a process for the production of a superphosphate-ammonium sulfate fertilizer in a simple expeditious manner which does not require long storing of the materials in the course of manufacture.

A further object of the invention is to provide a process for the production of a fertilizer by treating phosphate rock with sulfuric acid containing ammonium sulfate which obviates the necessity for an intermediate grinding of the materials used in the preparation of the fertilizer product and results in a fertilizer having satisfactory physical characteristics and in which a large proportion of the phosphate content is available as a plant food.

Another object of the invention is to provide a process for the preparation of the sulfuric acid of desired strength containing ammonium sulfate which is well adapted for use in the manufacture of a superphosphate-ammonium sulfate fertilizer from phosphate rock.

Other objects of the invention will in part be obvious and will in part appear hereinafter.

We have discovered that a valuable substantially dry fertilizer material containing available phosphate and nitrogen may be directly prepared by treating phosphate rock with a sulfuric acid of required strength containing ammonium sulfate and which may be prepared by mixing strong sulfuric acid with aqua ammonia to form a solution of ammonium sulfate containing a small amount of free sulfuric acid, and then reducing the concentration of the strong sulfuric acid with the thus prepared ammonium sulfate solution. A similar result may likewise be accomplished by admixing sulfuric acid with liquid or aqua ammonia, or by absorbing gaseous ammonia therein to obtain a solution appropriate for the treatment of phosphate rock in accordance with this invention.

We have discovered that when the sulfuric acid contains ammonium sulfate, the properties of the fertilizer resulting from treatment of phosphate rock with the sulfuric acid-ammonium sulfate mixture are improved and the manufacturing costs thereof are materially lowered. We have further found that in the treatment of phosphate rock in accordance with my invention a sulfuric acid of greater strength than has heretofore been found practicable should preferably be employed. Specifically, we have found that by the treatment of phosphate rock with a solution of sulfuric acid containing ammonium sulfate of a composition corresponding to not less than about 55° Bé. sulfuric acid, more particularly about 55° Bé. to 60° Bé., and preferably containing about 18 per cent. ammonium sulfate, and in quantity such that there is available for reaction with the phosphate rock an amount of free sulphuric acid corresponding to the amount employed in the customary method of producing superphosphate, a solid valuable fertilizer product may be obtained without necessitating a long curing of the materials in the course of preparation. The sulfuric acid-ammonium sulfate composition may be employed to advantage at temperatures of about 100° to 150° F.

The amount of ammonium sulfate may be varied depending on the sulfuric acid concentration and the solution temperature. It is possible to use a solution containing solid ammonium sulfate, but in general it is desirable to use solutions not exceeding saturation with respect to ammonium sulfate and more particularly solutions which are substantially saturated.

Further, we have discovered that the superphosphate-ammonium sulfate product of our invention may be treated with ammonia, whereby a product is obtained which contains a relatively large proportion of ammoniacal nitrogen and available phosphate which does not cake and which may be manufactured for sale without long and expensive storage periods during the course of preparation of the fertilizer. Our invention, therefore, comprises the preparation of sulfuric acid containing ammonium sulfate and the use of such a solution for the treatment of phosphate rock to produce a superphosphate-ammonium sulfate fertilizer.

The invention accordingly comprises the several steps and the relation of one or more of such steps with respect to each of the others thereof which will be exemplified in the processes hereinafter disclosed and the scope of the invention will be indicated in the claims.

For a fuller understanding of the nature and objects of the invention, reference should be had to the following detailed examples of processes illustrative of the manufacture of fertilizers in accordance with this invention.

*Example I.*—64° Bé. sulfuric acid is admixed with aqua ammonia containing 30 per cent. NH₃ in the proportions of about 1000 lbs. of the sulfuric acid to about 173 lbs. of the aqua ammonia to produce a solution of about 58° Bé. sulfuric acid containing about 18 per cent. of ammonium sulfate. The production of this solution is preferably carried out as follows: A solution of ammonium sulfate in sulfuric acid having approximately the same composition as the solution to be produced is introduced into a vessel. The sulfuric acid and aqua ammonia are then gradually and continuously introduced into the pool of the solution in the vessel in the proportions above indicated, e. g., in proportions such that by reaction of the acid and aqua ammonia, a product having the same composition as the composition of the pool is produced, the aqua ammonia being passed through a pipe submerged in the liquid in the vessel and introduced into the body of the liquid through perforations in the pipe as a plurality of fine streams. The heat liberated by the chemical reaction which takes place between the ammonia and sulfuric acid heats the solution to its boiling point. Some evolution of steam from the solution occurs, thus dissipating a part of the heat of reaction. A portion of the sulfuric acid containing ammonium sulfate thus formed is continuously withdrawn from the pool and, after cooling to the desired temperature, is used for the treatment of phosphate rock.

The phosphate rock is decomposed by mixing the solution therewith in the proportions of about 1 part by weight of phosphate rock (containing about 68–70 per cent. tri-calcium phosphate) to 1.05 parts of the sulfuric acid-ammonium sulfate composition. The mixed materials, after being held in a den for about 24 hours, form a solid product which may then be broken up and, after treatment with ammonia, the resultant relatively dry non-caking fertilizer product may be bagged for sale. If desired, the superphosphate-ammonium sulfate product from the den may be stored for a relatively short period of time to complete the curing of the material which may then be ground and bagged for sale. The fertilizer thus prepared will contain about 2% ammonia (NH₃).

*Example II.*—Water or an ammonium sulfate solution is introduced into a vessel. Ammonia is introduced under the surface thereof as in Example I and simultaneously 60° Bé. sulfuric acid added to the liquid in slight excess of the amount required to react with the ammonia. The ammonia may be introduced as a gas, liquid or as aqua ammonia. The solution boils due to the heat liberated by the reaction of the ammonia and sulfuric acid and the evolution of steam keeps the solution in violent agitation. Water is added to the bath at such a rate as to keep the solution substantially saturated with the ammonium sulfate which is produced, for example so that the resulting solution contains about 50 per cent. ammonium sulfate. The excess sulfuric acid is preferably sufficient to form a product containing about 3 per cent. to 5 per cent. free sulfuric acid. A hot solution of sulfuric acid and ammonium sulfate is continuously withdrawn from the vessel in proportion as the reacting materials are added thereto.

The solution containing 50 per cent. ammonium sulfate and about 4 per cent. sulfuric acid produced as described above, is added to a cold 66° Bé. sulfuric acid in the proportions of 1 part by weight of the ammonium sulfate solution to about 1.78 parts of the sulfuric acid. The product thus obtained corresponds to about a 58° Bé. sulfuric acid containing 18 per cent. of ammonium sulfate. This solution is employed in the proportions of about 1.05 parts by weight of the solution to about 1 part of phosphate rock for the decomposition of phosphate rock in the manner above described in conjunction with Example I to form a superphosphate-ammonium sulfate product. The solid product thus obtained may be treated with ammonia, preferably about 0.016 parts based on the solid product, to produce a fertilizer containing enhanced proportions of nitrogen.

If a superphosphate-ammonium sulfate product containing a smaller proportion of ammonium sulfate is desired, the 66° Bé. sulfuric acid may be admixed in part with ammonium sulfate solution and in part with water. On the other hand, a product containing a greater proportion of ammonium sulfate may be obtained by admixing the 66° Bé. sulfuric acid with an ammonium sulfate solution containing solid ammonium sulfate. Such a solution may be prepared by utilizing less water in the production of the acid solution of ammonium sulfate as described above than is sufficient to maintain all of the ammonium sulfate in solution. It is also possible to prepare a solution containing more than 50 per cent. ammonium sulfate by employing in the process of Example II an amount of sulfuric acid which results in the formation of a solution containing more than 5 per cent. free sulfuric acid. The use of a sulfuric acid containing an enhanced amount of ammonium sulfate in the treatment of phosphate rock, likewise results in the production of a product containing an increased proportion of ammonium sulfate.

Since certain changes may be made in carrying out the above process without departing from the scope of the invention, it is intended that all matter contained in the above description shall be interpreted as illustrative and not in a limiting sense. For example, solid ammonium sulfate containing a greater or lesser amount of water may be prepared from ammonia and sulfuric acid and mixed with 66° Bé. sulfuric acid. Or, a sulfuric acid of a strength less than 66° Bé. may be mixed with solid or a solution of ammonium sulfate in amount sufficient to give a sulfuric acid of the desired strength containing the desired proportion of ammonium sulfate. The solutions thus obtained, which may contain undissolved ammonium sulfate, are suitable for the treatment of phosphate rock as described above.

When in the specification and claims reference is made to a sulfuric acid of a given Baumé strength containing ammonium sulfate, it is intended to refer to a solution such as results from the addition of ammonium sulfate to a sulfuric acid solution in water of the given Baumé strength. Thus, a 58° Baumé sulfuric acid containing 18 per cent. ammonium sulfate is a solution having the same composition as a solution prepared by disolving 18 pounds of ammonium sulfate in 82 pounds of 58° Baumé sulfuric acid. The term "ammonium sulfate" is intended to include all salts formed by the interaction of ammonia and sulfuric acid.

We claim:

1. A process for the production of a nitrogen-phosphorus fertilizer which comprises producing a solid, substantially dry superphosphate-ammonium sulfate fertilizer by treating phosphate rock with that amount of sulfuric acid of about 58° Bé. strength which decomposes the phosphate rock to form superphosphate, said sulfuric acid containing dissolved therein a substantial amount of ammonium sulfate.

2. A process for the production of a nitrogen-phosphorus fertilizer which comprises producing a solid, substantially dry superphosphate-ammonium sulfate fertilizer by treating about 1 part of a phosphate rock with about 1.05 parts of a sulfuric acid of about 58° Bé. strength containing about 18 per cent. ammonium sulfate.

3. A process for the production of a nitrogen-phosphorus fertilizer which comprises decomposing about 1 part phosphate rock with about 1.05 parts of sulfuric acid having a strength of about 58° Bé. containing about 18 per cent. ammonium sulfate, and treating the resulting product with about .016 parts of ammonia.

EDWARD W. HARVEY.
HERMAN A. BEEKHUIS, Jr.